A. Kloman.
Pile for Girder-Iron.
Nº 75769        Patented Mar. 24, 1868
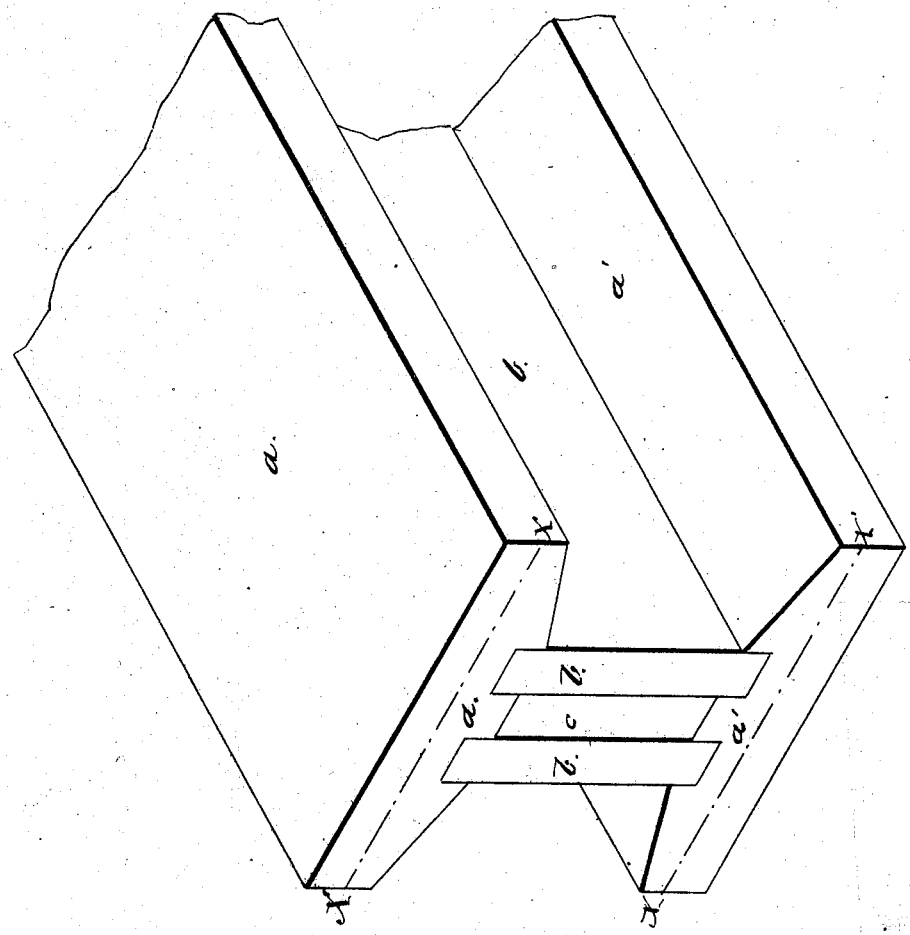
Attest:
W. D. Lewis
B. Cushing
Inventor;
Andrew Kloman
by Bakewell & Christy
his Attys.

United States Patent Office.

ANDREW KLOMAN, OF PITTSBURG, PENNSYLVANIA.

Letters Patent No. 75,769, dated March 24, 1868.

---

IMPROVEMENT IN PILES FOR GIRDER-IRONS.

---

*The Schedule referred to in these Letters Patent and making part of the same.*

---

TO ALL WHOM IT MAY CONCERN:

Be it known that I, ANDREW KLOMAN, of the city of Pittsburg, in the county of Allegheny, and State of Pennsylvania, have invented a new and useful Improvement in Making Piles for Girder-Iron; and I do hereby declare the following to be a full, clear, and exact description thereof, reference being had to the accompanying drawing, making a part of this specification, which is a perspective view of one end of my improved pile or fagot, and to the letters of reference marked thereon.

The nature of my invention consists in making a pile or fagot, to be rolled into a girder-beam, of top and bottom pieces, connected together by an arrangement of plates standing edgeways, each alternate one of such plates entering and filling grooves in the lower and upper faces of the top and bottom plates respectively.

To enable others skilled in the art to make and use my invention, I will proceed to describe its construction and mode of use.

$a$ $a'$ are top and bottom plates, formed by rolling, and usually increasing in thickness from either edge toward the centre, but grooved along near the centre, so as to receive in such grooves the edges of the plates $b$ $b$. Between the plates $b$ $b$, I place a plate, $c$, which is equal in breadth to the distance between the adjacent faces of the top and bottom pieces $a$ $a'$. The plates $b$ $c$ may be in any desirable number, according to their thickness, and the thickness desired in that part of the fagot, and the plates $b$, which enter grooves in the top and bottom plates $a$ $a'$, should alternate with the plates $c$, which rest against the lower and upper faces of such top and bottom pieces respectively. The fagot is then, after being fastened together with bands, clamps, or otherwise, heated, passed through reducing-rolls in the usual way, and rolled to the shape desired.

The particular advantage connected with this invention consists in the fact that by it I secure a stronger weld between the plates $b$ $c$, which form the web of the girder-beam, and the top and bottom plates $a$ $a'$. Where the line of weld by which the web is attached to the top and bottom pieces is straight, it is exceedingly difficult to secure so perfect a union that the parts will not separate along such line of weld under the enormous strain to which such beams are commonly subject. But, by grooving such top and bottom pieces, so as to admit the edges of each alternate plate $b$, I make a fagot which gives a line of weld which is considerably broken. Hence, I increase the amount of welding-surface, as well as secure a better weld. Also, since the sides of the grooves are welded to the sides of the plates $b$, I secure a weld, the plane of which is parallel to the direction of the strain, and such a weld is much less liable to fracture than one the plane of which is at right angles to the direction of the strain.

If desirable, the top and bottom pieces $a$ $a'$ may each consist of two or more separate plates, and, for that purpose, may be divided along the dotted lines $x$ $x$.

What I claim as my invention, and desire to secure by Letters Patent, is—

Making up a pile or fagot, to be rolled into girder-beams, of top and bottom pieces $a$ $a'$, connected together by plates $b$ and $c$, in any desirable number, the plates $b$ entering grooves in the lower and upper faces of the top and bottom pieces respectively, and alternating with plates $c$, substantially in the manner and for the purposes hereinbefore set forth.

In testimony whereof, I, the said ANDREW KLOMAN, have hereunto set my hand.

ANDREW KLOMAN.

Witnesses:
   A. S. NICHOLSON,
   G. H. CHRISTY.